United States Patent [19]

Wiest

[11] Patent Number: 6,014,389
[45] Date of Patent: Jan. 11, 2000

[54] FIBER-BASED CONTINUOUS WAVE BLUE LASER SOURCE

[75] Inventor: Todd E. Wiest, Herndon, Pa.

[73] Assignee: The United States of America as represented by the Secretary of the Air Force, Washington, D.C.

[21] Appl. No.: 08/823,099

[22] Filed: Mar. 24, 1997

[51] Int. Cl.[7] .............................. H01S 3/30; H01S 3/00; G02B 6/00
[52] U.S. Cl. .................................. 372/6; 372/39; 372/40; 372/68; 359/341; 359/343; 385/141; 385/123; 385/42; 385/45
[58] Field of Search ................................ 372/6, 39, 40, 372/43, 50, 68; 359/341, 343; 385/141, 127, 123, 37, 42, 45

[56] References Cited

U.S. PATENT DOCUMENTS

| | | | |
|---|---|---|---|
| 5,008,890 | 4/1991 | McFarlane | 372/41 |
| 5,216,681 | 6/1993 | St. Pierre et al. | 372/22 |
| 5,222,088 | 6/1993 | Amano | 372/22 |
| 5,574,740 | 11/1996 | Hargis et al. | 372/41 |
| 5,610,934 | 3/1997 | Zarrabi | 372/70 |
| 5,617,244 | 4/1997 | Percival et al. | 359/341 |
| 5,621,749 | 4/1997 | Baney | 372/69 |
| 5,638,394 | 6/1997 | Kim et al. | 372/68 |
| 5,644,584 | 7/1997 | Nam et al. | 372/20 |
| 5,677,920 | 10/1997 | Waarts et al. | 372/6 |
| 5,691,989 | 11/1997 | Rakuljic et al. | 372/20 |
| 5,751,751 | 5/1998 | Hargis et al. | 372/41 |
| 5,754,570 | 5/1998 | Goh | 372/6 |
| 5,761,227 | 6/1998 | Hargis et al. | 372/22 |

OTHER PUBLICATIONS

American Association for the Advancement of Science dated Mar. 21, 1997, vol. 275, No. 5307, "Staying Off Beaten Track Puts LED Researchers a Step Ahead", pp. 1734, 1735.

*Primary Examiner*—Brian Healy
*Attorney, Agent, or Firm*—Harold L. Burstyn

[57] ABSTRACT

A compact, continuous-wave blue laser is developed from a fiber made from heavy metal fluorides ("ZBLAN") doped with a rare-earth ion. The footprint required to create blue laser light is reduced because the fiber can be wound into spools of radius <25 mm and stacked one atop the other without cross talk. IR diodes ($\lambda\sim$790 nm and $\lambda\sim$1050 nm) are fiber-pigtailed to silica fiber in a conventional way. The light from the IR diodes is coupled to a single fiber through a 2×1 fiber coupler that has silica inputs and a ZBLAN output. The IR light optically excites the electrons of the rare-earth ions in the ZBLAN fiber host. This excitation causes the electrons to emit light at 480 nm (in the blue region of the visible spectrum) as they relax to the ground state. Dielectric mirrors feed back the emitted light. A high-reflector, high-transmitter ("HRHT") is the input coupler of the pumping light; a partial reflector, the output coupler. A graded index ("GRIN") lens is attached, at the end of the output coupler from which the emitted laser beam exits, to improve the quality of the emitted beam.

19 Claims, 2 Drawing Sheets

Tm:ZBLAN Energy Levels

FIBER-BASED CONTINUOUS WAVE BLUE LASER SOURCE

STATEMENT OF GOVERNMENT INTEREST

The invention described herein may be manufactured and used by or for the Government for governmental purposes without the payment of any royalty thereon.

BACKGROUND OF THE INVENTION

The present invention relates to optical storage media, and, in particular, to improving storage densities in such media by means of lasers that operate at short wavelengths.

There is a pressing need to improve information storage densities in optical media. Currently, optical storage systems use lasers with a wavelength of ~780 nm. A blue laser with a wavelength of 400–500 nm could improve storage density four fold because its focused spot size would be substantially smaller than the 780 nm laser's.

When the first optical memory systems were developed, it was understood that a compact laser source in the blue region of the spectrum could increase storage density. However, compact blue laser sources do not yet exist. Existing blue laser sources are approximately the size of a desktop computer (See Verdeyen, *Laser Electronics*, 2nd Ed., (Englewood Cliffs, N.J., 1989) at 334). To use an existing blue laser source in an optical storage system doubles the size of the computer, making the storage system too bulky for desktop applications. Also, existing blue lasers require substantial air cooling, thereby further restricting their use in optical storage systems.

Thus there exists a need for a compact blue laser source. With the large market for ultra-high-density memory storage in a compact system, the development of compact blue lasers is of high priority.

There are three methods for creating a compact source for blue laser light. The first is to fabricate a semiconductor chip that provides the required feedback to an amplifier section whose signal gain is in the blue region of the spectrum. Laser devices of this type that emit blue light have too short a lifetime at room temperature for use in an optical memory system ("The End of the Beginning", *Compound Semiconductor* (July/August 1995) at 35).

The second method requires a high-power semiconductor laser and a doubling crystal. The emission from the high-power diode has a wavelength from 800–1000 nm. This light interacts with the crystal to produce a photon with a frequency twice the frequency of the pump photons. Laser emission results when the doubling crystal is placed in an optical cavity that supplies feedback in the blue region of the spectrum (Goldberg, et al., "Blue light generation in bulk periodically field poled $LiNbO_3$", 31 *Electronics Letters* 1576–1577 (1995)).

This method is impractical for three reasons. First, since the crystal length is typically less than two centimeters, the number of blue photons created per pass through the crystal is small. Hence this method is too inefficient for practical application. Second, the optical system required to generate blue light comprises mirrors. For optimized operation, the mirrors must be within 0.001 mm of the correct position; making the system environmentally unstable. Third, the size of the high-powered diode laser, the electronics to drive it, and the large heat sink required to maintain it in stable operation make this system too large for a desktop optical storage system.

A third method for generating blue laser light uses as the gain material an optical fiber doped with a rare earth ion. A fiber made from heavy metal fluorides is the only fiber host that has shown any significant emission in the blue region of the spectrum. This fiber, called ZBLAN in its preform stage, is comprised of fluorides of zirconium, barium, lanthanum, aluminum, and sodium. To generate blue laser light, this fiber can be doped with either trivalent praseodymium ($Pr^{3+}$) or trivalent thulium ($Tm^{3+}$).

Praseodymium has exhibited lasing at 491 nm when pumped by infrared laser diodes (Baney, et al., "Blue $Pr^{3+}$-doped ZBLAN fiber upconversion laser", 21 *Optics Letters* 1372–1374 (1996)). However, $Pr^{3+}$ dopant yields strong emissions at other visible wavelengths (red, orange, and green), all of which share the same upper laser level. Thus doping with $Pr^{3+}$ does not produce blue light as efficiently and with as much power as does doping with $Tm^{3+}$.

Blue lasers of Tm:ZBLAN fiber have been created using a single-laser diode pump at a wavelength between 1120 nm and 1160 nm (Sanders, et al., "Laser diode pumped 106 mW blue upconversion fiber laser", 67 *Applied Physics Letters* 1815–1817 (1995)). This single-wavelength pumping scheme suffers from two significant drawbacks. First, creating laser diodes that operate in the 1120 to 1160 nm region is very difficult. Second, the absorption of pump photons cannot be optimized at a single pump wavelength. Upconversion to the energy level of a blue light laser requires three different transitions, and none of them resonates at the single wavelength. Thus the threshold for lasing rises, demanding higher output from the pump laser. Also, a small deviation in the output wavelength of the pump laser reduces substantially the performance of the blue laser.

Therefore the need for a compact blue laser system cannot be satisfied by any apparatus or method currently available.

SUMMARY OF THE INVENTION

One object of the present invention is to provide a compact blue laser system.

Another object of the present invention is to provide a compact blue laser system that overcomes the drawbacks of the prior art.

A further object of the present invention is to provide a compact blue laser system that creates blue laser light by means of thulium-doped ZBLAN fiber fed by more than one wavelength of IR laser light.

Still a further object of the present invention is to provide a compact blue laser system that reduces the footprint required to create blue laser light by employing a geometry where optical fibers are wound into spools of radius <25 mm and stacked one atop the other without cross talk.

The present invention embodies in a novel configuration the third of the methods of generating blue light described above. The apparatus and method of the present invention uses ZBLAN fiber doped with trivalent thulium, $Tm^{3+}$, to yield blue light. The ZBLAN preform is drawn into fiber to make the gain material of the present invention. To create a blue laser with this apparatus and method requires optical pumping from at least two infrared ("IR") semiconductor diodes and optical feedback from wavelength-selective mirrors.

To generate blue laser light from IR diodes, the electrons in orbit around the $Tm^{3+}$ nucleus must absorb IR light that resonates with the broad absorption band of the $^3H_6 \rightarrow {}^3F_4$ transition. Since an electron excited to the $^3F_4$ state will stay there for ~1 ms., the probability that another IR photon with a wavelength near 1050 nm will be absorbed is large. Hence the electron is excited to a more energetic state ($^3F_4$–$^1G_4$ transition). While the $^1G_4$ state is also long-lived, i.e., metastable, no more IR photons are absorbed since there are no other higher energy levels with a resonant absorption at either of the IR wavelengths. Thus the electrons in the $^1G_4$ state decay to ground state, emitting photons with a wavelength near 480 nm, that is, within the blue portion of the optical spectrum. For greater efficiency, the present invention uses two lasers to excite the gain medium (Tm-doped ZBLAN fiber). Pumping from two diodes is more efficient than from one, since the wavelengths of the two diode lasers can be selected to maximize the Tm absorptions ($^3H_6$→$^3F_4$ and $^3F_4$→$^1G_4$). Also, though using two lasers may increase the cost of the apparatus and method of the present invention, it reduces the precision required to obtain the exact pump laser wavelengths, compared with single-diode pumping. Even though creating blue light in the apparatus and method of the present invention requires the same number of IR photons as the frequency doubling method described above, the present invention, because it is fiber-based, requires fewer optical components, smaller pump lasers, and less space.

To create the blue laser, optical feedback to the $^1G_4$×$^3H_6$ emission is applied by placing dielectric mirrors at the ends of the Tm:ZBLAN fiber or by epoxying separate optical mirrors to the ends of the fiber. In either case, two reflective elements are required. The first of these, a high-reflector, high-transmitter ("HRHT"), allows the pumped light to enter into the laser cavity. For this invention, the HRHT has high transmission (~99.9%) at the IR diode wavelengths and high reflection (~99.9%) at the laser wavelength (480 nm)., The second reflecting element is placed on the side of the gain material opposite the HRHT. This element, called the output coupler, is from 30% to 90% reflecting at 480 nm. Thus it couples from 10% to 70% of the light out of the cavity.

Since the light emitted from the laser diverges rapidly from the end of the fiber, to obtain a high-quality beam one either forms a lens on the end of the fiber or attaches a graded index ("GRIN") lens there. The spatial profile of this laser is identical to the $LP_{01}$ mode that supports the 1050 nm pump light, since the largest gain at 480 nm will occur where both IR laser spatial propagation modes overlap.

In summary, the present invention reduces the footprint required to create blue laser light by utilizing a fiber that can be wound into spools of radius <25 mm and stacked one atop the other without cross talk. IR diodes ($\lambda$~790 nm and $\lambda$~1050 nm) are fiber-pigtailed to silica fiber in a conventional way. The light from the two IR diodes is then coupled to a single fiber using a specially designed 2×1 fiber coupler that has silica inputs and a ZBLAN output. The IR light then optically excites the electrons of the Tm ions in the ZBLAN fiber host. This excitation causes the electrons to relax to the ground state with an emission at 480 nm (in the blue region of the visible spectrum). This emission is amplified by dielectric mirrors, a HRHT as the input coupler of the pump light and a partial reflector as the output coupler. A graded index ("GRIN") lens is attached, at the end of the output coupler from which the emitted laser beam exits, to improve the quality of the emitted beam.

These and many other objects and advantages of the present invention will be ready apparent to one skilled in the pertinent art from the following detailed description of a preferred embodiment of the invention and the related drawings.

DESCRIPTION OF THE PREFERRED EMBODIMENT

Figure 1:
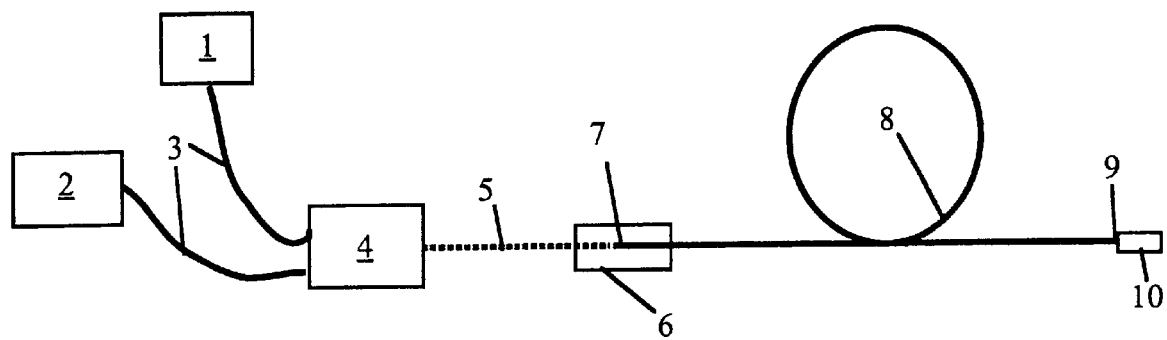
FIG. 1 is a schematic diagram of the CW blue fiber laser of the present invention.

Referring to FIG. 1, a laser diode 1 emits in single mode substantially at 790 nm. A laser diode 2 emits in single mode substantially at 1050 nm. Pigtailed to each of laser diodes 1 and 2, to allow permanent coupling of their laser emissions, is a single-mode silica fiber 3, which feeds their respective outputs to a 2×1 silica-to-ZBLAN coupler 4. Single-mode silica fibers 3 are fusion spliced to the silica inputs of coupler 4. In coupler 4, the two inputs from single-mode silica fibers 3 are combined to reduce to nominal any power loss of the pump signals. The dual wavelength signal is then connected to an undoped ZBLAN fiber 5 that serves as the output of coupler 4. After exiting coupler 4, the light from both diode lasers 1 and 2 is thus contained in a single fiber: undoped ZBLAN fiber 5.

The light is then directed into a mechanical splice 6 that preserves the mode quality of the input light. Mechanical splice 6 joins undoped ZBLAN fiber 5 to an end of a Tm:ZBLAN fiber 8. A HRHT dielectric mirror 7 is deposited on the end of the fiber 8. HRHT dielectric mirror 7 is made of appropriate material to create a quarter-wave stack that has the following characteristics: ≅99.5% reflection at 480 nm and ≅99.9% transmission at 790 and 1050 nm. HRHT dielectric mirror 7 allows the pumped laser light to pass into Tm:ZBLAN fiber 8 while limiting the amount of blue laser light that is lost by propagating back through the system.

As pumping laser light propagates along Tm:ZBLAN fiber 8, its power is attenuated. Depending on the application, the length of the Tm:ZBLAN fiber 8 can be changed slightly, along with the output power of the light from laser diodes 1 and 2, to allow some of the pumping light to be emitted from Tm:ZBLAN fiber 8. The pumping light that is absorbed by the $Tm^{3+}$ ions in Tm:ZBLAN fiber 8 will result in the emission of light at 480 nm in the blue-green region of the spectrum.

To create laser emission, an optical cavity is formed by placing another mirror, a dielectric mirror 9, at the end of Tm:ZBLAN fiber 8. Dielectric mirror 9 is fabricated of the same materials and of a similar design as HRHT dielectric mirror 7. However, dielectric mirror 9 has different characteristics: 30–90% reflection at 480 nm and ≅99.9% transmission at 790 and 1050 nm, hence 10–70% transmission at 480 nm.

Since the light emitted from Tm:ZBLAN fiber 8 after the output coupler will be diverging rapidly because of diffraction, the laser emission will be useless without focusing or collimation. A lightweight GRIN lens 10 is attached to the end of Tm:ZBLAN fiber 8 by any appropriate means. Index matching material must be applied to the fiber/lens interface to inhibit any etalon effects. This index matching material must limit the reflection between the last layer of dielectric mirror 9 and the front facet of GRIN lens 10, which must be coated against reflection at 480 nm.

Figure 2:
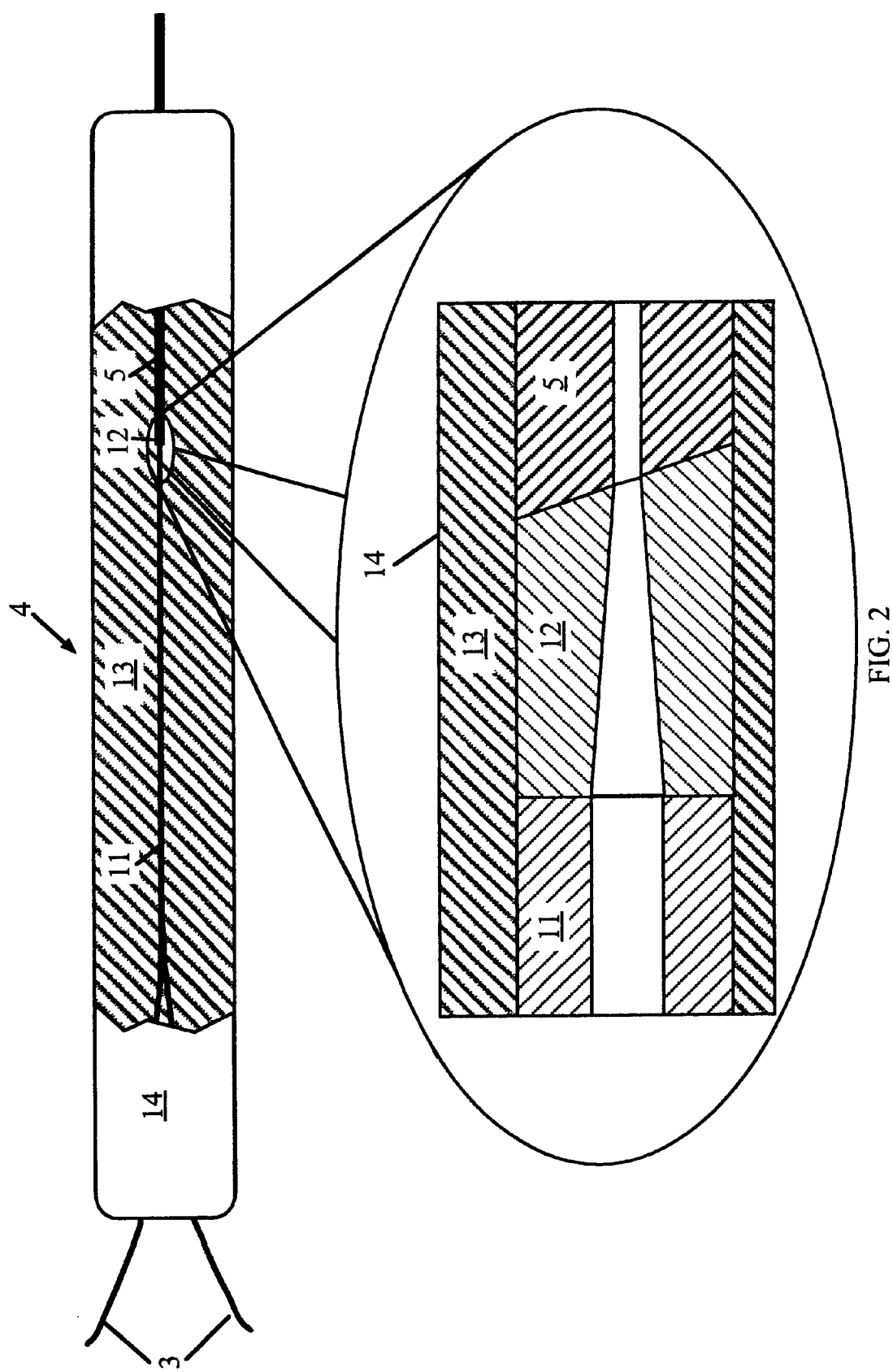
FIG. 2 is an enlarged schematic of the 2×1 silica-to-ZBLAN coupler of FIG. 1.

Referring to FIG. 2 for more detail of a portion of the apparatus shown in FIG. 1, inputs from silica fibers 3 enter coupler 4 where they are coupled into a single-mode silica fiber 11. To preserve the single-mode properties of the pumping light as the waveguide core size changes, a thermally expanded core ("TEC") fusion splice 12 connects undoped ZBLAN connector 5 and single-mode silica fiber 11. Coupler 4 is surrounded by an isolation material 13 that is in turn covered by a protective cover 14.

Figure 3:
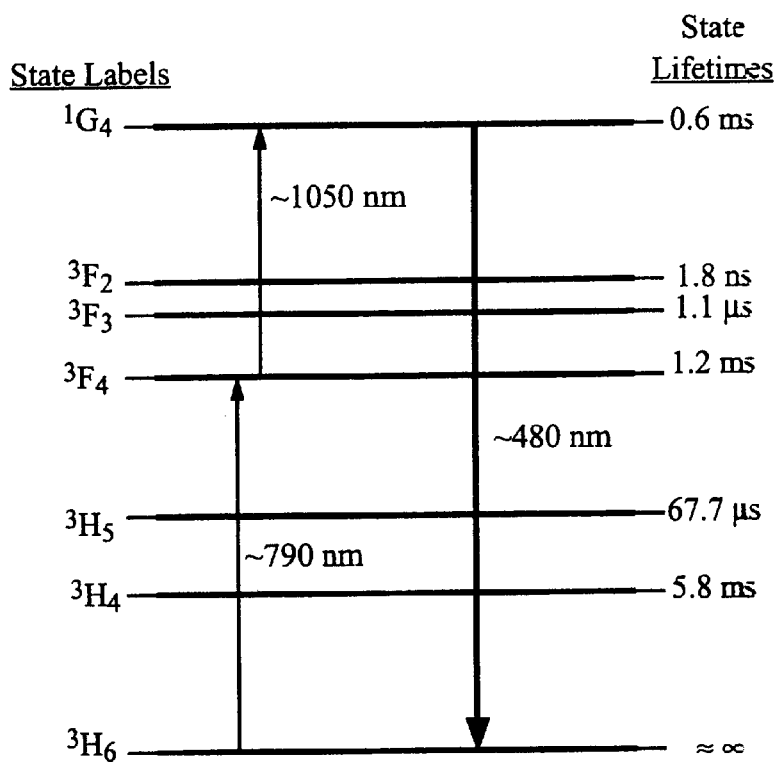
FIG. 3 is a diagram of the energy levels (including state lifetimes) of the electronic states of the thulium ion in fluorozirconate fiber, showing the two IR absorption transitions (up arrows with approximate wavelengths) and the laser transition (down arrow with approximate wavelength).

Referring to FIG. 3, laser diode 1 operates around 790 nm with single spatial mode output; laser diode 2, around 1050 nm. Optical pumping excites electrons in orbit around the $Tm^{3+}$ nucleus in the dopant of Tm:ZBLAN fiber 8 in two stages from the $^3H_6$ to the $^1G_4$ state via the $^3F_4$ state. The electrons in the $^1G_4$ state decay to ground, emitting photons with a wavelength near 480 nm, the blue light required for ultra-high-density storage in a compact medium.

Clearly many modifications and variations of the present invention are possible in light of the above teachings, and it is therefore understood that, within the scope of the inventive concept, the invention may be practiced otherwise than as specifically claimed.

What is claimed is:

1. Apparatus for generating continuous-wave laser light in the blue region of the visible spectrum, which comprises:

at least a first and a second laser diode;

said at least a first laser diode being effective for emitting a first light emission at a wavelength of substantially 790 nm;

said at least a second laser diode being effective for emitting a second light emission at a wavelength in a range from 1000 to 1160 nm;

apparatus for coupling said first and said second light emissions in a first fiber effective for transmitting said first and said second light emissions;

said first fiber being undoped;

apparatus for coupling said first fiber to a second fiber;

said second fiber having a first and a second end;

said second fiber being doped with a rare-earth ion effective for causing a third light emission at a wavelength in the range from 400 to 500 nm;

a first reflecting element being effective for reflecting said third light emission and for transmitting any other light emission;

said first reflecting element being positioned at said first end of said second fiber;

a second reflecting element being positioned at said second end of said second fiber;

said first and said second reflecting element forming an optical cavity within said second fiber; and said second reflecting element being effective for transmitting at least ten percent and reflecting the remainder of said third light emission.

2. Apparatus as in claim 1, where said at least a first and a second diode are a plurality of diodes.

3. Apparatus as in claim 1, where said first fiber is a ZBLAN fiber and said second fiber is a ZBLAN fiber doped with an effective quantity of $Tm^{+3}$.

4. Apparatus as in claim 1, where said first reflecting element is a high-reflector, high-transmitter dielectric mirror.

5. Apparatus as in claim 4, where said dielectric mirror has high reflection at wavelengths in the blue portion of the spectrum and high transmission at wavelengths in the infrared portion of the spectrum.

6. Apparatus as in claim 1, where said second reflecting element reflects laser light at 480 nm in a range from 30% to 90%, thereby transmitting in a range from 70% to 10%.

7. Apparatus as in claim 1, further including a lens located in proximity to said second end of said second fiber.

8. Apparatus as in claim 7, where said lens is a graded index lens.

9. A method of generating continuous-wave laser light in the blue region of the visible spectrum, which comprises the steps of:

emitting a first laser beam at a wavelength of substantially 790 nm;

emitting a second laser beam at a wavelength in the range from 1000 to 1160 nm;

combining said first and said second laser beams in a gain medium effective for optical pumping of said first and second laser beams;

pumping said combined first and second laser beams into an optical cavity;

bounding said optical cavity at a first end by a first reflecting element that effectively reflects blue light and effectively transmits infrared light; and bounding said optical cavity at a second end by a second reflecting element that effectively transmits infrared light and reflects from 30 to 90 percent of blue light, whereby said second reflecting element transmits a third laser beam of blue light.

10. A method as in claim 9, comprising the additional step of focusing said third laser beam emitted from said optical cavity.

11. Apparatus for generating continuous-wave laser light in the blue region of the visible spectrum, which comprises:

first means for emitting a first laser beam at a wavelength of substantially 790 nm;

second means for emitting a second laser beam at a wavelength in the range from 1000 to 1160 nm;

means for combining said first and said second laser beams in a gain medium effective for optical pumping of said first and second laser beams;

means for pumping said combined first and second laser beams into an optical cavity;

first means for bounding said optical cavity at a first end by a first reflecting element that effectively reflects blue light and effectively transmits infrared light; and second means for bounding said optical cavity at a second end by a second reflecting element that effectively transmits infrared light and reflects from 30 to 90 percent of blue light, whereby said second reflecting element transmits a third laser beam of blue light.

12. Apparatus as in claim 11, further comprising means for focusing said third laser beam emitted from said optical cavity.

13. Apparatus as in claim 11, wherein said first and said second means for emitting include at least a first and a second laser diode.

14. Apparatus as in claim 11, wherein said first and said second means for emitting include a plurality of laser diodes.

15. Apparatus as in claim 11, wherein said means for combining and said means for pumping each includes a ZBLAN optical fiber.

16. Apparatus as in claim 15, wherein a portion of said ZBLAN optical fiber is doped with an effective quantity of $Tm^{+3}$.

17. Apparatus as in claim 11, wherein said first and said second means for bounding are each a high-reflector, high-transmitter dielectric mirror.

18. Apparatus as in claim 12, wherein said means for focusing is a lens located in proximity to said second reflecting element.

19. Apparatus as in claim 18, wherein said lens is a graded index lens.

\* \* \* \* \*